United States Patent [19]
Bharucha et al.

[11] 3,966,974
[45] June 29, 1976

[54] CURING OF MEAT USING ORGANIC NITRITES

[75] Inventors: Kekhusroo R. Bharucha, Toronto; Charles K. Cross, Rexdale; Leon J. Rubin, Toronto, all of Canada

[73] Assignee: Canada Packers Limited, Toronto, Canada

[22] Filed: June 4, 1975

[21] Appl. No.: 583,798

Related U.S. Application Data

[63] Continuation-in-part of Ser. No. 426,131, Dec. 19, 1973, abandoned.

[52] U.S. Cl.............................. 426/265; 426/266; 426/332; 426/652
[51] Int. Cl.²..................... A23L 1/272; A23L 1/31; A23B 4/14
[58] Field of Search............ 426/265, 266, 332, 652

[56] References Cited
UNITED STATES PATENTS

| | | | |
|---|---|---|---|
| 2,828,212 | 3/1958 | Sair...................................... | 426/652 |
| 3,386,836 | 6/1968 | Borenstein et al.............. | 426/265 X |

*Primary Examiner*—James R. Hoffman
*Attorney, Agent, or Firm*—Bacon & Thomas

[57] ABSTRACT

The formation of nitrosamines in fried, broiled or grilled cured meat products is reduced or eliminated by using organic nitrites, such as n-butyl nitrite, in the curing mixtures in lieu of conventional sodium nitrite and sodium nitrite-sodium nitrate combinations. An ascorbate or isoascorbate is preferably present in the curing mixture.

22 Claims, No Drawings

CURING OF MEAT USING ORGANIC NITRITES

COPENDING APPLICATION

This application is a Continuation-in-Part of application Ser. No. 426,131, filed Dec. 19, 1973 and now abandoned.

BACKGROUND OF THE INVENTION

This invention relates to meat curing.

Cured meat products have been prepared for many years by treatment of fresh meat with an alkali metal nitrite-containing composition or with a composition containing a mixture of alkali metal nitrite and an alkali metal nitrate. Other materials, such as sodium chloride and sugar, are generally present in the curing mixture. Spices may be added. Ascorbic acid, isoascorbic acid (sometimes called erythorbic acid) or salts of ascorbic acid or isoascorbic acid have been found to accelerate the formation of cured meat pigments.

The conventional alkali metal nitrite or nitrate-nitrite containing curing mixtures provide quite satisfactory cures insofar as cured meat preservation, flavor and development of the pink to red color characteristic of cured meats are concerned. Nitrates were one time used alone and then one had to depend on bacterial action for their conversion to nitrites during the curing process. No practical subsitute for the nitrite ion in the curing process has yet been discovered.

Unfortunately, minute amounts of undesirable nitrosamines may occur in meats, particularly bacon, which have been cured with the conventional curing mixtures, and which have been cooked by methods in which the fats reach relatively high temperatures. These nitrosamines are not found in the cured raw meats. Apparently, the temperaure attained by the fats in frying or equivalent cooking processes, such as broiling, grilling, microwave heating, etc., facilitates the reaction of alkali metal nitrites and amines to form nitrosamines. Since nitrosamines have been found to be carcinogenic in rat tests, they are regarded as a potential hazard in human food products. It is desirable, therefore, to eliminate the nitrosamine causing substances from the curing mixtures.

SUMMARY OF THE INVENTION

The present invention provides a meat curing composition and a method of curing meat which use organic nitrites which have boiling points below those attained at frying temperatures in lieu of the alkali metal nitrite or alkali metal nitrate-nitrite components of the conventional curing compositions and methods. Ascorbate or isoascorbate is preferably used along with the organic nitrite. It has been found that the low boiling organic nitrites will perform essentially the same curing functions as sodium nitrite but that most, or all of the organic nitrite will dissipate during processing and frying (or equivalent cooking process) before it has a chance to react with amion acids or amines to form nitrosamines.

It is an object of the invention to provide meat curing compositions and methods which reduce or eliminate the potential hazard of nitrosamine formation during the subsequent cooking of the cured meat.

It is another object of the invention to provide a composition and method for curing bacon which reduces or eliminates the formation of nitrosamines during the subsequent frying or equivalent cooking process (hereinafter generally designated as frying), of the cured bacon.

DETAILED DESCRIPTION

The organic nitrites which are effective for purposes of the present invention are those which will act either per se or after hydrolysis by the moisture present to effectively cure the meat, but which will dissipate during processing and frying so as not to be present to form nitrosamines. However, it is not intended that the invention be limited by this theory of operation.

In general, those organic nitrites which have boiling points between about 15°C and 150°C, and preferably between about 30°C and 120°C, are suitable for the purposes of the invention. Representative of such nitrites are alkyl nitrites wherein the alkyl group contains 2 to 8 carbon atoms such as ethyl nitrite, n-propyl nitrite, isopropyl nitrite, n-butyl nitrite, tertiary butyl nitrite, amyl nitrite, hexyl nitrite and the like. Preferably, the alkyl group has at least 3 carbon atoms. The temperature of the meat in some curing processes may be raised, e.g. to about 54°C or more. However, organic nitrites having boiling temperatures below these processing temperatures may be used since a sufficient quantity will remain in the interior of the meat to effect the cure. A preferred compound is n-butyl nitrite which has a boiling point of 78°C.

The amount of organic nitrite used in the curing compositions and methods should be that which is sufficient to provide the meat with a nitrite cure. The curing compositions themseleves may be substantially identical to those known in the art except that the alkali metal nitrite or nitrite-nitrate has been replaced with an equivalent amount of organic nitrite. In such mixtures an ascorbate or isoascorbate is preferably present. These are well known in the art as evidenced, for example, by U.S. Pat. No. 3,386,836. Further, an emulsifying agent may be present to facilitate the incorporation of the organic nitrite into the aqueous medium.

The curing agents are dissolved or dispersed in water to form a so-called "pickle" solution in which the meats are soaked or which is injected into the meats. A combination of these procedures can be used. Thus, the meat can be soaked in the pickle solution for a sufficient time to permit diffusion of the solution throughout the meat. Alternatively, the pickle solution can be pumped through the vascular system of the meat cut or injected directly into the muscle by use of a plurality of needles. After pumping or injection, the meat cut may be given a soaking period in the pickle solution. In the case of bacon, the amount of pickle solution incorporated in the meat may be in the order of about 10%, and in the case of hams may be about 18%. However, these amounts are subject to wide variations at the choice of the processor.

The quantitites of the various ingredients in the pickle solution can be varied widely depending on the meat to be cured and the type of cure. Typically, the curing solution may contain, on a weight basis, from about 5 to 25% NaCl, from about 4 to 12% of sugars, e.g., sucrose and dextrose, from about 0.1 to 4% ascorbate or isoascorbate, from about 0.05 to 1% organic nitrite, from about 0.025 to 1% emulsifying agent and the remainder, water.

Any suitable edible emulsifying agent that will facilitate the dispersion of the organic nitrite in water may be used. Representative examples of emulsifying agents are the polyoxyalkylene derivatives of hexitol anhydride partial long chain fatty acid esters, known under the "Tween" trademark. However, the invention is not limited to the use of these representative substances.

In the processing of bacon, hams and the like, after incorporation of the pickle solution, the meat may be subjected to a conventional heating and/or smoking step. Typically, bacon is heated in this step to an internal temperature of about 55°C and larger cuts such as hams to an internal temperature of about 67°C.

EXAMPLE 1

A standard pickle solution was prepared by dissolving 17½ pounds of NaCl, 6 pounds of sucrose and 1½ pounds of dextrose in 10 gallons of water. Sodium isoascorbate was added to provide a level of 2.2% in the solution. A solution of 2 parts of n-butyl nitrite in 1 part of Tween-60 (polyoxyethylene derivative of sorbitan monostearate) was added to the solution in an amount sufficient to provide an n-butyl nitrite level of 1705 ppm which is equivalent to 1100 ppm of sodium nitrite. The resulting solution was used to cure bacon bellies by multiple injection of the solution to a level of 10% by weight and the bellies were then smoked and heated to a temperature of 55°C. After processing, the bacon had a satisfactory appearance. Fried rashers of the cured bacon were satisfactory from the standpoint of appearance and flavor.

The process was repeated with the exception that the organic nitrite-emulsifier solution was added to the standard pickle solution to provide organic nitrite levels equivalent to 550 and 1650 ppm of sodium nitrite. Different levels of sodium isoascorbate were also used.

EXAMPLE 2

The process of Example 1 was repeated except that tertiary butyl nitrite (boiling point 63°C) was used as the organic nitrite.

EXAMPLE 3

The process of Example 1 was repeated except that n-propyl nitrite (boiling point 46°–48°C) was used as the organic nitrite.

In each of the Examples, the organic nitrites were found to cure the bacon, giving it the characteristic color and flavor.

The following table (Table I) provides the results of a comparative nitrosamine study on bacon cured with pickle solution containing 1100 ppm $NaNO_2$ versus bacon cured with pickle solution containing 1705 ppm n-butyl nitrite (equivalent of 1100 ppm $NaNO_2$), in each case with 2.2% of sodium isoascorbate. At the pumping level of 10% the meat contained 100 ppm of $NaNO_2$ or 155 ppm n-butyl nitrite (the equivalent of 100 ppm NaNO) and 2000 ppm sodium isoascorbate. In these experiments paired bacon bellies (left and right bellies from the same animal) were used, one receiving the $NaNO_2$ pickle and the other containing the organic nitrite pickle. The standard pickle solution was that described in Example 1 above. After curing, samples of the bacon were fried in each experiment over a period of 12 minutes up to a maximum temperature of 330°–340°F. and the cook-out fat was analyzed for nitrosamines.

TABLE 1

| Expt. No. | Nitrite Added (ppm) $NaNO_2$ | Nitrite Added (ppm) n-Butyl Nitrite | Na Isoascorbate (ppm) | Nitrite as $NaNO_2$ (ppm) prior to frying | Weight of Cook-out Fat (gm) | Weight of Rashers (gm) | Nitrosamine Cook-out Fat | (ppb) Rashers |
|---|---|---|---|---|---|---|---|---|
| 1a | 100 | 0 | 2000 | 31 | 439 | 158 | 22 | 4.5 |
| 1b | 0 | 155 | 2000 | 11 | 432 | 141 | 2.5 | — |
| 2a | 100 | 0 | 2000 | 19 | 388 | 185 | 7.5 | 5.0 |
| 2b | 0 | 155 | 2000 | 11 | 310 | 164 | 1.3 | — |
| 3a | 100 | 0 | 2000 | 35 | 330 | 157 | 10 | 5.0 |
| 3b | 0 | 155 | 2000 | 11 | 288 | 135 | 2.8 | — |

The superiority of n-butyl nitrite over $NaNO_2$ with respect to nitrosamines is readily apparent. The amount of nitrosamines in the cook-out fat for the n-butyl nitrite cured bacon in each of the three tests was less than 3 parts per billion (ppb) which represents the minimum amount which could be accurately detected by the analytical method used. Since most of the nitrosamines show up in the cook-out fat (the fried meat usually containing less than one-half as much as the cook-out fat) the nitrosamine content of the fried n-butyl nitrite cured meat is regarded as negligible.

The following table provides nitrosamine results for n-butyl nitrite and t-butyl nitrite used in the standard pickle solution at the 1100 ppm level (based on $NaNO_2$ equivalent), with and without sodium isoascorbate. The organic nitrites were emulsified with the pickle solution using Tween-60 in the ratio of 1:2 (Tween:nitrite). The cured bacon was fried and the cook-out fat analyzed as before.

TABLE II

| Organic Nitrite Added (ppm) n-Butyl | Organic Nitrite Added (ppm) t-Butyl | Na Isoascorbate (ppm) | Nitrite as $NaNO_2$ (ppm) Prior to Frying | Nitrosamine (ppb) in Cook-out fat |
|---|---|---|---|---|
| 155 | — | 0 | 33 | 20 |
| 155 | — | 0 | 37 | 18 |
| — | 155 | 0 | 45 | 20 |
| — | 155 | 0 | 45 | 23 |
| 155 | — | 2000 | 8 | 1.9 |
| 155 | — | 2000 | 9 | 0.3 |
| — | 155 | 2000 | 10 | 8.8 |
| — | 155 | 2000 | 13 | 11 |

It is apparent from the foregoing table that when sodium isoascorbate was used in conjunction with the organic nitrites, the levels of nitrosamines found in the cook-out fat were drastically reduced and in the case of n-butyl nitrite to levels below the accurately detectable amounts.

The following table provides a nitrosamine comparison between bacon cured at 10% pumping levels with pickle solution containing NaNO$_2$ at 1100 and 1650 ppm levels and pickle solution containing isopropyl nitrite at the corresponding equivalent levels of sodium nitrite (namely 1155 ppm and 1760 ppm), with and without sodium isoascorbate (1.15% level). The isopropyl nitrite was emulsified in the standard pickle solution with Tween 60 (2 nitrite: 1 Tween). The cured bacon was fried and the fat analyzed as before.

TABLE III

| Expt. No. | Nitrite Added (ppm) NaNO$_2$ | Nitrite Added (ppm) Isopropyl Nitrite | Na Isoascorbate ppm | Nitrite as NaNO$_2$ Prior To Frying ppm | Nitrosamine (ppb) in Cook-out Fat |
|---|---|---|---|---|---|
| 1A | 100 | 0 | 0 | 63 | 23 |
| 1B | 0 | 105 | 0 | 35 | 17 |
| 2A | 100 | 0 | 1050 | 13 | 8 |
| 2B | 0 | 105 | 1050 | 1 | 4 |
| 3A | 150 | 0 | 0 | 83 | 31 |
| 3B | 0 | 160 | 0 | 41 | 13 |
| 4A | 150 | 0 | 1050 | 62 | 18 |
| 4B | 0 | 160 | 1050 | 7 | 7 |

Experiments 1A, 1B; 2A, 2B, etc., represent paired bacon bellies from the same animal. In all of the experiments the nitrosamine level in the cook-out fat was considerably lower in the case of the organic nitrite cured bacon than in the comparable NaNO$_2$ cured bacon. The use of sodium isoascorbate in combination with the nitrite considerably reduced the eventual formation of nitrosamines, both with the organic nitrite and NaNO$_2$ cure, in the case of the organic nitrite cures to quite low levels.

It will be understood that the organic nitrites may be used to replace all or part of the alkali metal nitrite or nitrite-nitrate salts of the standard pickle solution.

It will also be understood that the meat curing compositions of this invention can be used in the curing of other meat products including whole cuts of beef, as well as pork and chopped or comminuted meat mixtures.

The following Example is representative of the use of the invention in ground meat mixtures.

EXAMPLE 4

To a solution of sucrose (3.6g), dextrose (0.9g), sodium chloride (9.9g) and sodium isoascrobate (1.3g) in water (60 ml) 0.22 ml mixture (2:1) of n-butyl nitrite in Tween 60 was added and the resultant solution added to ground pork (600g). After allowing to stand overnight at refrigeration temperature, the pork was fried and the cook-out fat analysed for nitrosamines.

The above procedure was repeated using only 0.65g and 0.32g of sodium isoascorbate. In all three mixtures, the meat was found to be cured by appearance. Results are summarised in the following table.

It is noted that even in mixture 3 where the molar ratio of ascorbate to organic nitrite is less than 2, there is negligible formation of nitrosamines. These compositions may also be used for curing hams, bacon and other whole cuts of meat.

We claim:
1. A composition for the curing of meats comprising a meat curing pickle solution containing an organic nitrite curing agent of boiling point in the range of about 15° to 150°C, said organic nitrite being emulsified in said solution in an amount providing at least a portion of the nitrite requirement of conventional alkali metal nitrite curing solutions.

2. The composition of claim 1 wherein the meat curing pickle solution is a standard alkali metal nitrite curing solution wherein at least a portion of the alkali metal nitrite solution is replaced with an organic nitrite.

3. A composition for the curing of meats comprising a meat curing pickle solution free of alkali metal nitrites and nitrates and containing an organic nitrite curing agent of boiling point between about 15° and 150°C, said organic nitrite being emulsified in said solution in an amount providing the equivalent nitrite requirement of conventional alkali metal nitrite curing solutions.

4. The composition of claim 3 wherein the organic nitrite has a boiling point in the range of about 30° to 120°C.

5. The composition of claim 3 wherein the organic nitrite is an alkyl nitrite in which the alkyl group contains 2 to 8 carbon atoms.

6. The composition of claim 3 wherein the organic nitrite is n-butyl nitrite.

7. The composition of claim 3 including an ascorbate or isoascorbate.

8. The composition of claim 3 wherein the edible emulsifier is included to emulsify the organic nitrite in the pickle solution.

9. A composition for the curing of meats comprising a pickle solution free of alkali metal nitrites and nitrates and containing emulsified therein an alkyl nitrite, in which the alkyl group contains 3 to 8 carbon atoms, said alkyl nitrite having a boiling point in the range of about 15° to 150°C and being present in an amount sufficient to provide a nitrite equivalent of a conven-

| Mixture No. | n-Butyl nitrite (ppm) added | Sodium Isoascorbate (ppm) | Mole Isoascorbate Mole Butyl Nitrite | Nitrosamine (ppb) in cook-outfat |
|---|---|---|---|---|
| 1 | 220 | 2000 | 4.72 | 1.3 |
| 2 | 220 | 1000 | 2.36 | 3.3 |
| 3 | 220 | 500 | 1.18 | 4.2 | tional alkali metal nitrite curing solution and an ascorbate or isoascorbate.

10. The composition of claim 9 wherein the alkyl nitrite is emulsified in the pickle solution with an edible emulsifier.

11. The composition of claim 9 wherein the alkyl nitrite is n-butyl nitrite.

12. A composition for the curing of meats comprising an aqueous medium containing sodium chloride, a sugar, sodium isoascorbate, n-butyl nitrite and an edible emulsifier, said medium being free of alkali metal nitrites and nitrates and the n-butyl nitrite being present in an amount sufficient to provide a nitrite equivalent of a conventional alkali metal nitrite curing solution.

13. A method for the curing of meats comprising contacting the meat with a curing solution containing an organic nitrite of boiling point in the range of about 15° to 150°C, said organic nitrite being emulsified in said solution in an amount sufficient to provide a nitrite equivalent of a conventional alkali metal nitrite curing solution.

14. The method of claim 13 wherein the organic nitrite has a boiling point in the range of about 30° to 120°C.

15. The method of claim 13 wherein the organic nitrite is an alkyl nitrite in which the alkyl group contains 3 to 8 carbon atoms.

16. The method of claim 13 wherein the organic nitrite is n-butyl nitrite.

17. The method of claim 13 in which the curing solution also contains ascorbate or isoascorbate.

18. A method for reducing the nitrosamine content of fried, grilled or broiled cured meat comprising curing said meat with a curing solution which is free of alkali metal nitrites and nitrates and which contains ascorbate and isoascorbate and an organic nitrite of boiling point in the range of about 15° to 150°C, said organic nitrite being emulsified in said solution in an amount sufficient to provide a nitrite equivalent of a conventional alkali metal nitrite curing solution.

19. The method of claim 18 wherein the organic nitrite is n-butyl nitrite.

20. A method for curing bacon so as to reduce or eliminate the formation of nitrosamines when the cured bacon is fried, broiled or grilled comprising curing said bacon with a curing solution which is free from alkali metal nitrites and nitrates and which contains ascorbate or isoascorbate and an organic nitrite of boiling point in the range of about 15° to 150°C, said organic nitrite being emulsified in said solution in an amount sufficient to provide a nitrite equivalent of a conventional alkali metal nitrite curing solution, said organic nitrite having a boiling point sufficiently low to enable it to volatilize at frying, broiling or grilling temperatures.

21. The method of claim 20 wherein the organic nitrite is n-butyl nitrite.

22. A method of preparing a meat curing composition comprising emulsifying an organic nitrite, having a boiling point in the range of about 15° to 150°C, into an aqueous medium containing other meat curing components in an amount providing a nitrite equivalent of a conventional alkali metal nitrite curing composition.

* * * * *